(12) United States Patent  (10) Patent No.: US 8,379,122 B2
Muramatsu  (45) Date of Patent: *Feb. 19, 2013

(54) SOLID-STATE IMAGE-PICKUP DEVICE, CAMERA SYSTEM, AND METHOD FOR DRIVING SAME

(75) Inventor: Yoshinori Muramatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/721,714

(22) Filed: Mar. 11, 2010

(65) Prior Publication Data

US 2010/0165164 A1  Jul. 1, 2010

Related U.S. Application Data

(63) Continuation of application No. 11/733,020, filed on Apr. 9, 2007, now Pat. No. 7,705,897.

(30) Foreign Application Priority Data

Apr. 10, 2006 (JP) .................................. 2006-107149

(51) Int. Cl.
H04N 5/335 (2011.01)
(52) U.S. Cl. ....................................... 348/294; 348/302
(58) Field of Classification Search .......... 348/294–310; 250/208.1; 341/155–172
See application file for complete search history.

(56) References Cited

U.S. PATENT DOCUMENTS

| 5,801,657 | A | 9/1998 | Fowler et al. |
| 5,877,715 | A | 3/1999 | Gowda et al. |
| 6,721,785 | B1 | 4/2004 | Raghunandan |
| 7,471,230 | B2 | 12/2008 | Tooyama et al. |
| 7,705,897 | B2* | 4/2010 | Muramatsu .................... 348/294 |
| 2001/0005227 | A1* | 6/2001 | Egawa et al. ................. 348/304 |
| 2003/0202111 | A1 | 10/2003 | Park |
| 2004/0135909 | A1* | 7/2004 | Jung ............................. 348/296 |
| 2005/0110886 | A1* | 5/2005 | Miyazaki ...................... 348/308 |

(Continued)

FOREIGN PATENT DOCUMENTS

| JP | 2002-010146 | 1/2002 |
| JP | 2002-232291 | 8/2002 |

(Continued)

OTHER PUBLICATIONS

Woodward Yang et al.; An Integrated 800x600 CMOS Imaging System; ISSCC Digest of Technical Papers; p. 304-305; Feb. 1999.

*Primary Examiner* — Chieh M Fan
*Assistant Examiner* — Dwight C Tejano
(74) *Attorney, Agent, or Firm* — SNR Denton US LLP

(57) ABSTRACT

A solid-state image-pickup device includes a plurality of pixels, each of which is operable to convert an incident-light quantity into a respective electrical signal. The image-pickup device includes a plurality of analog-to-digital converters that each converts an analog signal obtained from a respective one of the pixels into a digital signal. Each analog-to-digital converter includes an output having a plurality of bits and a plurality of comparators. Each of the comparators compares a respective one of a plurality of reference voltages changing over time to the analog signal from the same one of the pixels. At least first and second reference voltages are transmitted to respective ones of the comparators. The analog signal is read from the pixel two times for each row, and a difference between a result of first reading and a result of second reading is calculated.

7 Claims, 9 Drawing Sheets

U.S. PATENT DOCUMENTS

| | | | |
|---|---|---|---|
| 2005/0195304 A1* | 9/2005 | Nitta et al. | 348/308 |
| 2006/0012507 A1* | 1/2006 | Nitta et al. | 341/156 |
| 2006/0012698 A1* | 1/2006 | Nitta et al. | 348/308 |
| 2007/0046795 A1* | 3/2007 | Yamashita | 348/294 |
| 2007/0139544 A1 | 6/2007 | Egawa et al. | |
| 2008/0111904 A1 | 5/2008 | Lee | |

FOREIGN PATENT DOCUMENTS

| | | |
|---|---|---|
| JP | 2003-198372 | 7/2003 |
| JP | 2005-328135 | 11/2005 |
| JP | 2005-347932 | 12/2005 |

\* cited by examiner

SOLID-STATE IMAGE-PICKUP DEVICE, CAMERA SYSTEM, AND METHOD FOR DRIVING SAME

RELATED APPLICATION DATA

This application is a continuation of U.S. patent application Ser. No. 11/733,020, filed Apr. 9, 2007, the entirety of which is incorporated herein by reference to the extent permitted by law. The present application claims the benefit of priority to Japanese Patent Application JP 2006-107149 filed in the Japanese Patent Office on Apr. 10, 2006, the entire contents of which are incorporated herein by reference to the extent permitted by law.

BACKGROUND OF THE INVENTION

1. Field of the Invention

The present invention relates to a solid-state image-pickup device, a camera system, and a method of driving the same (or belongs to the field of the solid-state image-pickup device, the camera system, and the method of driving the same).

2. Description of the Related Art

A known complementary-metal-oxide-semiconductor (CMOS)-image sensor with a column-parallel analog-to-digital converter (hereinafter, an analog-to-digital converter is abbreviated, as an ADC) mounted thereon had been reported. The above-described CMOS-image sensor is disclosed in "An Integrated 800×600 CMOS Image System" by W. Yang et al., ISSCC Digest of Technical Papers, p. 304-305, February 1999, for example.

The configuration of an example known CMOS-image sensor with a column-parallel ADC mounted thereon is illustrated in a block diagram of FIG. 7.

As shown in FIG. 7, a solid-state image-pickup device 101 includes a plurality of pixels 12, where each of the pixels 12 includes a photodiode and an in-pixel amplifier. The pixels 12 are arranged in matrix form so that a pixel array 11 is generated. A column-parallel ADC includes a comparator 21 and a memory device 51. The comparator 21 compares a reference signal (reference voltages) RAMP generated by a digital-to-analog converter (hereinafter abbreviated, as a DAC) 19 to an analog signal obtained from the pixel 12 for each of row lines H0, H1, and so forth via column lines V0, V1, and so forth. The memory 51 stores information about a result of counting performed by a counter 52 configured to count a comparison-time period. The column-parallel ADC has an n-bit-digital-signal-conversion function. Further, the column-parallel ADC is provided for each of the column lines V0, V1, and so forth so that a column-parallel-ADC block 55 is formed.

Each of horizontal-output lines 16 includes a 2n-bit-wide horizontal-output line, and the 2n sense circuits, subtraction circuit 53, and output circuit corresponding to each of the output lines. Further, a timing-control circuit 20 generating an internal clock, a row-scanning circuit 18 configured to control a row address and row scanning, and a column-scanning circuit 17 configured to control a column address and column scanning are provided, as a control circuit configured to read signals transmitted from the pixel array 11 in sequence.

Next, operations of the example known CMOS-image sensor will be described with reference to a timing chart of FIG. 8 and the block diagram of FIG. 7.

After first reading and transmission of data from the pixel 12 of an arbitrary row line Hx to the column lines V0, V1, and so forth are stabilized, a stepwise waveform obtained by changing a reference voltage over time to the reference voltage RAMP generated by the DAC 19, and the comparator 21 compares the reference voltage RAMP to the voltage of an arbitrary column line Vx. At the same time as when the stepwise waveform is transmitted to the reference voltage RAMP, the counter 52 performs the first counting. When the reference voltage RAMP becomes equivalent to the voltage of the column line Vx, an output transmitted from the comparator 21 is reversed. At the same time, information about the count value corresponding to the comparison-time period is stored in the memory device 51. At the first-reading time, a reset component ΔV is read from each of the pixels 12. The reset component ΔV includes a noise that varies for each of the pixels 12. Usually, however, the variations in the reset components ΔV are insignificant and all of the pixels 12 are reset on the same level. Therefore, an output from the arbitrary column line Vx is approximately known. Therefore, when the reset component ΔV is read for the first time, the comparison-time period can be reduced by adjusting the reference voltage RAMP. In the above-described known example, the comparison among the reset components ΔV is performed over the count-time period corresponding to 7 bits (128 clock signals).

At the second-reading time, the signal component corresponding to an incident-light quantity of each of the pixels 12 is read in addition to the reset component ΔV. That is to say, after the second reading and transmission of data from the pixel 12 of an arbitrary row line Hx to the column lines V0, V1, and so forth are stabilized, the stepwise waveform obtained by changing the reference voltage over time to the reference signal (reference voltage) RAMP generated by the DAC 19, and the comparator 21 compares the reference voltage RAMP to the voltage of the arbitrary column line Vx. At the same time as when the step-wise waveform is transmitted to the reference voltage RAMP, the counter 52 performs the second counting. When the reference voltage RAMP becomes equivalent to the voltage of the column line Vx, an output transmitted from the comparator 21 is reversed. At the same time, information about the count value corresponding to the comparison-time period is stored in the memory device 51. At that time, count-value data obtained through the first counting and that obtained through the second counting are stored in the memory device 51 at different positions.

After the above-described AD-conversion time period, a column-scanning circuit 17 performs the following processing. Namely, n-bit digital signals that are obtained through each of the first counting and the second counting and that are stored in the memory device 51 are transmitted through 2n horizontal-output lines 16, subjected to subtraction processing shown as (the second-counting signal)−(the first-counting signal) in sequence through a subtractor 53, and externally transmitted. After that, the above-described processing is performed for each of the rows so that a two-dimensional image is generated.

In the above-described known example, time changes in the reference voltage are counted. Therefore, the output-bit number is determined according to the number of clock signals of the counter (The number of count-clock signals should be increased by two times, so as to increase the precision of one bit. Subsequently, the output-bit number can be increased only by increasing the clock frequency and/or decreasing the reading speed.

SUMMARY OF THE INVENTION

Since time changes in a reference voltage are counted, the output-bit number is determined on the basis of the number of clock signals of a counter. Therefore, the number of count-clock signals should be increased by two times, so as to increase the precision of one bit. Subsequently, the output-bit number can be increased only by increasing the clock frequency and/or decreasing the reading speed.

The present invention allows for obtaining an output with high bit precision within the bounds of necessity without increasing the clock frequency and/or decreasing the reading speed.

A solid-state image-pickup device according to an embodiment of the present invention includes a plurality of analog-to-digital converters that has a plurality of pixels converting an incident-light quantity into an electrical signal and that converts an analog signal obtained from each of the pixels into a digital signal. The analog-to-digital converter includes a plurality of comparators, wherein each of the comparators compares a reference voltage changing over time to the analog signal and wherein different reference voltages including at least first and second reference voltages are transmitted to the comparators, and at least one counter that counts a time period required to finish the comparison made by the comparator, that stores information about a result of the counting, and that has different count numbers.

Thus, according to the above-described embodiment of the present invention, the analog-to-digital converter includes the plurality of comparators, wherein each of the comparators compares the reference voltage changing over time to the analog signal, wherein the different reference voltages are transmitted to the comparators, and the at least one counter that counts the time period required to finish the comparison made by the comparator, that stores the information about the result of the counting, and that has the different count numbers. Therefore, it becomes possible to set an i-bit counter, where the letter i indicates a natural number, and a j-bit counter, where the letter j indicates another natural number and an expression i>j holds. The j-bit counter is used only on the least-significant-bit side.

According to the above-described embodiment of the present invention, the plurality of comparators and the counters corresponding to the comparators are provided. Therefore, the following processing procedures can be performed by the i-bit counter and the j-bit counter at the same time. Namely, the time period where reference voltages with different amplitudes change and become equivalent to the voltage of an output transmitted from an arbitrary column line is counted by as much as i bit, the i bit is determined to be a bit on the most-significant-bit side at the output time, the j bit is determined to be a bit on the least-significant-bit side, and the i bit and the j bit are output, as an i+j bit. Further, at the second-reading time, each of read results can be stored in the i-bit counter and the j-bit counter for every column, as a digital value, and calculation can be executed for each of the columns so that no error occurs.

DESCRIPTION OF THE PREFERRED EMBODIMENTS

Figure 1:
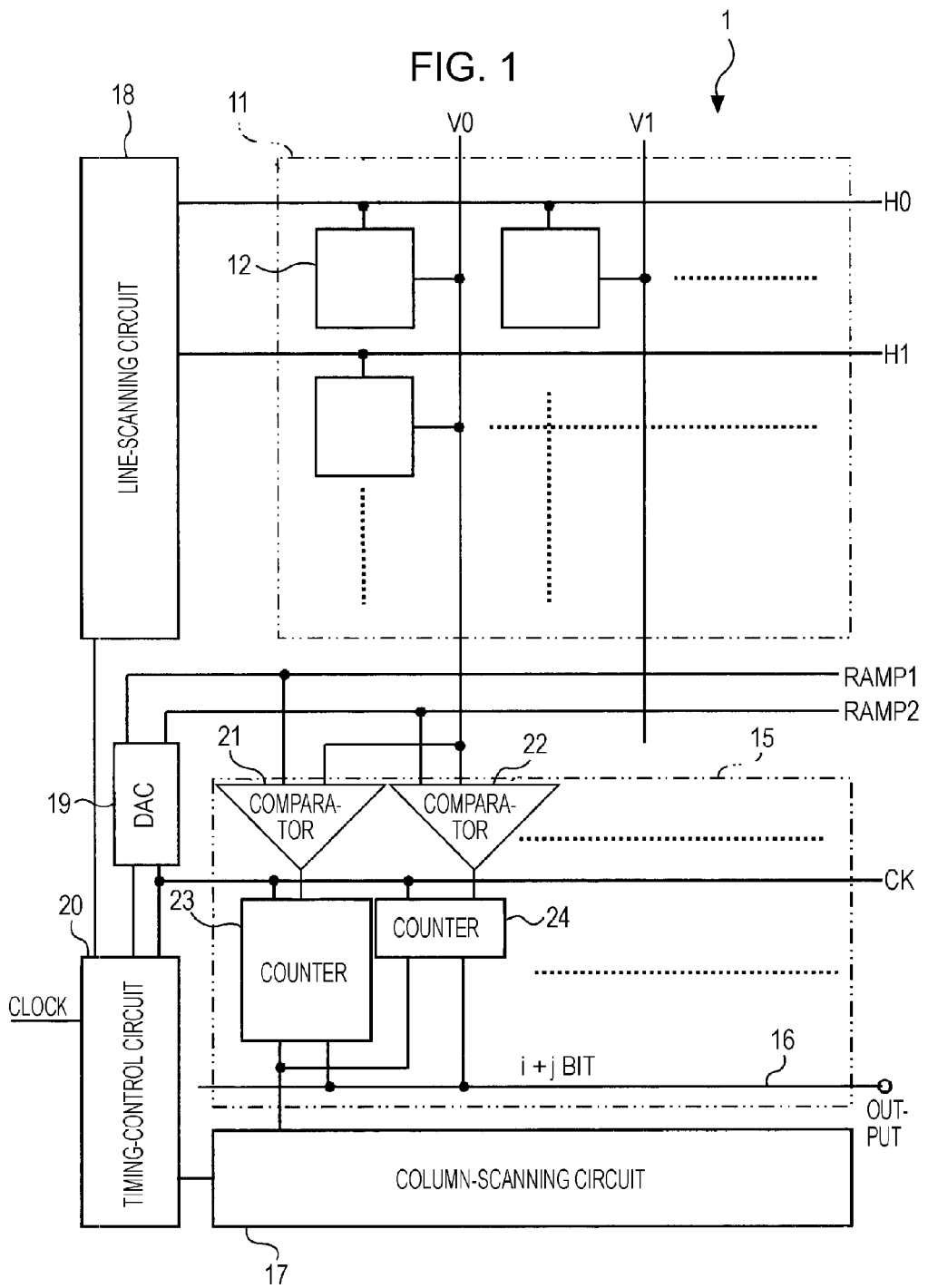
FIG. 1 is a block diagram illustrating an embodiment (a first embodiment) of the present invention.

FIG. 1 is a block diagram illustrating an embodiment (a first embodiment) of the present invention. FIG. 1 shows a complementary metal-oxide semiconductor (CMOS) sensor with a column-parallel ADC mounted thereon.

As shown in FIG. 1, a solid-state image-pickup device 1 includes a plurality of pixels 12 arranged in matrix form in a two-dimensional manner, so that a pixel array 11 is formed. Each of the pixels 12 includes a photodiode and an in-pixel amplifier, for example.

A column-parallel-ADC block 15, which is a column-parallel analog-to-digital converter, includes comparators 21 and 22, and counters (up/down counters, for example) 23 and 24. The comparators 21 and 22 compare reference signals (reference voltages) RAMP 1 and RAMP2 generated by a digital-to-analog converter (hereinafter abbreviated, as a DAC) 19 configured to generate the reference signals RAMP1 and RAMP2 to analog signals obtained from the pixels 12 for each of row lines H0, H1, and so forth via column lines V0, V1, and so forth. The counters 23 and 24 count comparison-time periods required to finish the comparisons made by the comparators 21 and 22, and store information about the count results. The above-described comparator 21 and counter 23 achieve an i-bit-digital-signal-conversion function (where the letter i denotes a natural number), and the above-described comparator 22 and counter 24 achieve a j-bit-digital-signal-conversion function (where the letter j indicates another natural number and the expression i>j holds). The comparators 21 and 22, and the counters 23 and 24 are provided for each of the column lines V0, V1, and so forth so that the column-parallel ADC block 15 is generated.

Each of horizontal-output lines 16 includes an i+j-bit-wide horizontal-output line and i+j sense circuits and i+j output circuits, where each of the sense circuits and output circuits corresponds to each of the horizontal-output lines. Further, a timing-control circuit 20 generating an internal clock, a row-scanning circuit 18 configured to control a row address and row scanning, and a column-scanning circuit 17 configured to control a column address and column scanning are provided, as a control circuit configured to read signals transmitted from the pixel array 11 in sequence. Still further, though not shown, other various signal-processing circuits may be provided.

In the first embodiment, the column-parallel-ADC block 15 includes the comparators 21 and 22, and the counters (up/down counters) 23 and 24. The up/down counter may be an asynchronous up/down counter that can operate with high speed by using a single count-control clock. Further, a high-speed-count clock including a phase-locked-loop (PLL) circuit may be generated, so as to make the up/down counter operate with high speed. The up/down counter according to the first embodiment has a simple circuit configuration and can operate with high speed. Thus, the up/down counter according to the first embodiment has many advantages. On the other hand, two counters may be provided in place of the up/down counter. The counters may not be arranged in a column-parallel manner and two memory units may be provided. Hereinafter, each of the counters 23 and 24 is described, as the up/down counter.

Figure 2:
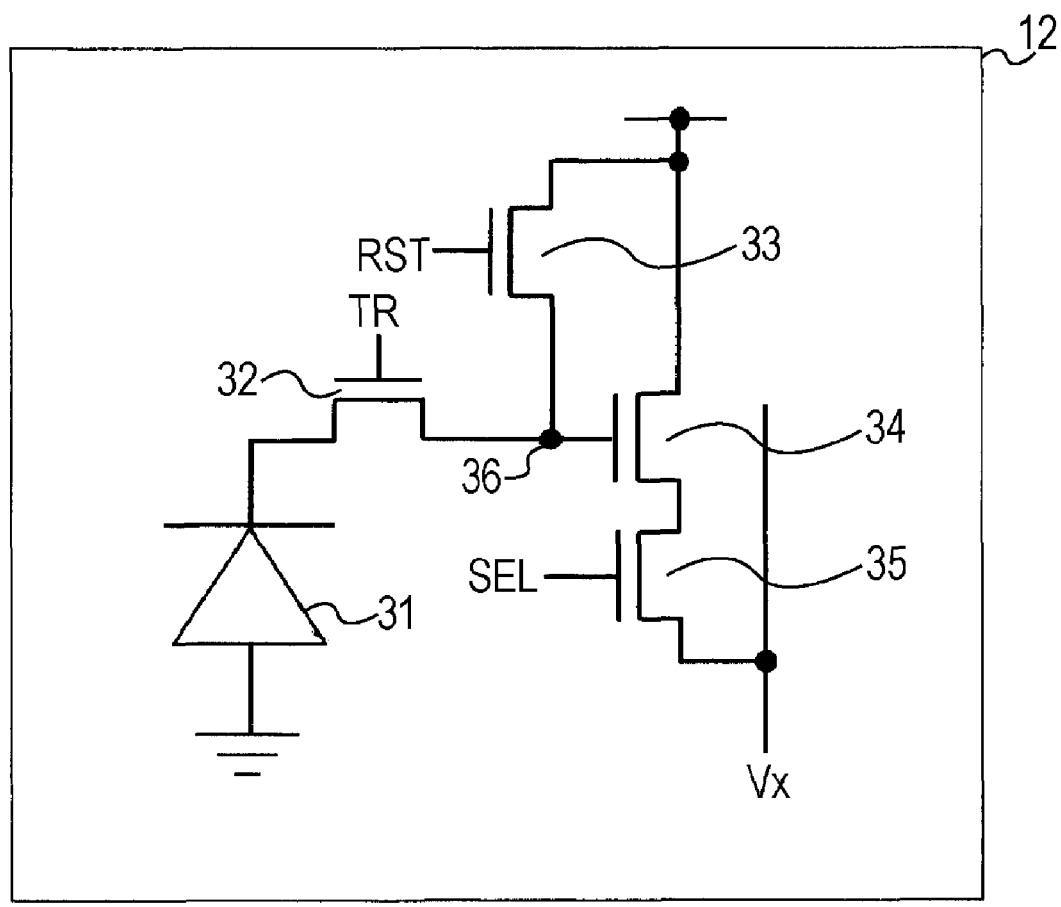
FIG. 2 is a circuit diagram illustrating an example circuit configuration of a pixel.

FIG. 2 shows an example circuit configuration of the above-described pixel 12. The pixel 12 includes a photodiode 31, a transfer transistor 32 configured to transfer an electrical charge of the photodiode 31 to a floating-diffusion layer 36 through a control signal TR, an amplifier transistor 34 that can conduct signal amplification for an electrical charge of the floating-diffusion layer 36 by performing source-follower reading with a current source provided at the end of a line Vx, a reset transistor 33 configured to reset an electrical charge of the floating-diffusion layer 36 or the like by using a control signal RST, and a selection transistor 35 configured to read and transmit a signal to the line Vx by using a control signal SEL. According to the above-described example circuit configuration, each of the above-described transistors is provided, as an N-channel transistor. However, part of or all of the above-described transistors can be provided, as a P-channel transistor, so as to achieve the above-described example circuit configuration. Otherwise, the transfer transistor 32 and/or the selection transistor may be eliminated so that the power source performs selection control, or the plurality of pixels may share an arbitrary component.

Figure 3:
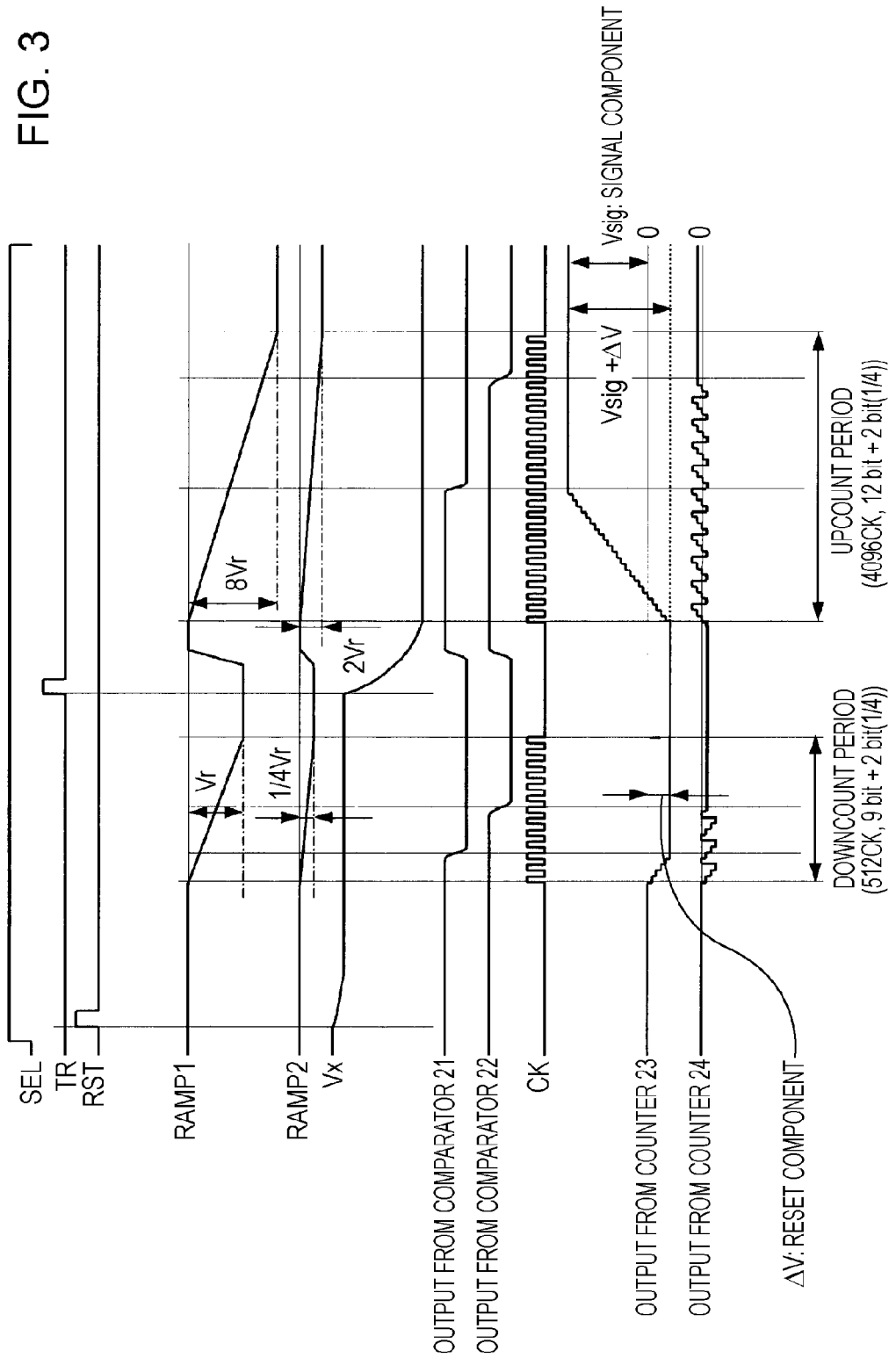
FIG. 3 is a timing chart showing example operations performed according to the first embodiment.

Next, operations performed by the solid-state image-pickup device 1 (CMOS image sensor) described in the first embodiment will be described with reference to the block diagram shown in FIG. 1, the circuit diagram shown in FIG. 2, and a timing chart shown in FIG. 3. In the following description, the letter i indicates 12 bits, the letter j indicates 2 bits, and a 14 (i+j=12+2=14)-bit output is obtained.

After first reading and transmission of data from the pixel 12 of an arbitrary row line Hx to column lines V0, V1, and so forth are stabilized, the DAC 19 transmits a stepwise waveform (9 bits, 512 steps, and an amplitude of 1 Vr) obtained by changing a reference voltage over time to a reference-signal (reference voltage) RAMP1, and the comparator 21 compares the reference signal RAMP1 to the voltage of an arbitrary column line Vx. At the same time, the DAC 19 transmits a stepwise waveform (9 bits, 512 steps, and an amplitude of ¼ Vr (an amplitude of ⅛ Vr where the expressions ½$^j$ and j=3 hold, or an amplitude of 1/16 Vr where the expressions ½$^j$ and j=4 hold)) obtained by changing a reference voltage over time to a reference-signal (reference voltage) RAMP2, and the comparator 22 compares the reference signal RAMP2 to the voltage of the arbitrary column line Vx.

A clock signal is transmitted from the timing-control circuit 20 to a control line CK, so as to measure the comparison time through the up/down counters 23 and 24 provided for each of row lines, at the same time as when the stepwise waveforms are transmitted to the reference signals RAMP1 and RAMP2, and the first comparison time is counted down. Each of the up/down counters 23 and 24 is an asynchronous up/down counter. As for the control line CK alone, internal counting can be achieved through a single input.

When the voltage of each of the reference signals RAMP1 and RAMP2 becomes equivalent to that of the column line Vx, an output from each of the comparators 21 and 22 is reversed. At the same time, count operations of the up/down counters 23 and 24 are stopped and information about count values corresponding to the comparison-time period is stored in each of the up/down counters 23 and 24. Here, the up/down counter 23 is a 12-bit-up/down counter capable of counting from 0 to 4095. Further, the up/down counter 23 may be a 13-bit-up/down counter in consideration of overcounting. Further, the up/down counter 24 is a 2-bit-up/down counter that performs 2-bit-counting down repeatedly until the output from the comparator 22 is reversed.

At the first-reading time, a reset component ΔV of each of the pixels 12 is read. The reset component ΔV includes a noise that varies for each of the pixels 12. Usually, however, the variations in the reset components ΔV are insignificant and all of the pixels are reset on the same level. Therefore, an output from the arbitrary column line Vx is approximately known. Therefore, when the reset component ΔV is read for the first time, the comparison-time period can be reduced by adjusting the RAMP voltage. In the first embodiment, the comparison among the reset components ΔV is performed over the count-time period corresponding to 9 bits (512 clock signals).

At the second-reading time, the signal component corresponding to an incident-light quantity of each of the pixels 12 is read in addition to the reset component ΔV, and the same operations as those of the first reading are performed. That is to say, after the second reading and transmission of data from the pixel 12 of the arbitrary row line Hx to the column lines V0, V1, and so forth are stabilized, the DAC 19 transmits the stepwise waveform obtained by changing the reference voltage over time to each of the reference-signals RAMP1 and RAMP 2, and the comparators 21 and 22 compare the reference signals RAMP1 and RAMP2 to the voltage of the arbitrary column line Vx.

A clock signal is transmitted to the control line CK, so as to measure the comparison time through the up/down counters 23 and 24 provided for each of row lines, at the same time as when the stepwise waveforms are transmitted to the reference signals RAMP1 and RAMP2, and the second comparison time is counted up, as opposed to the case where the first counting is performed.

The value of operations performed by each of the up/down counters 23 and 24 is counted down at the first-counting time and counted up at the second-counting time, so that the subtraction shown as (the second comparison-time period)−(the first comparison-time period) is automatically executed in the counters. When the voltage of each of the reference signals RAMP1 and RAMP2 becomes equivalent to that of the column line Vx, an output from each of the comparators 21 and 22 is reversed. At the same time, the count operations performed by the up/down counters 23 and 24 are stopped and information about the count values corresponding to a result of the subtraction shown as (the second comparison-time period)−(the first comparison-time period) is stored in each of the up/down counters 23 and 24.

According to the up/down counter 23, the expression (the second comparison-time period)−(the first comparison-time period)=(signal component+ΔV+offset component of ADC)−(ΔV+offset component of ADC)=(signal component (12 bits)) holds. The above-described two reading operations and the subtraction performed by the up/down counter 23 allow for eliminating the reset component ΔV including the noise that varies for each of the pixels 12 and the offset component of each ADC. Subsequently, it becomes possible to obtain the 12-bit-precision-signal component corresponding to the incident-light quantity of each of the pixels 12.

At the second reading time, the signal component corresponding to the incident-light quantity is read out. Therefore, the RAMP voltage should be significantly changed, so as to determine the size of light quantity over a wide range. In the first embodiment, therefore, the read signal components are compared to one another over the count-time period corresponding to 12 bits (4096 clock signals). A 4096+512-clock-count-time period including the first count-down-time period may be provided, so as to make full use of a dynamic range. In that case, the up/down counter 23 should be provided, as a 13-bit up/down counter in consideration of the possibility of overcounting.

Although the comparison-bit number corresponding to the first reading is different from that corresponding to the second reading, it is arranged that the inclination of the voltage of the reference signal RAMP obtained at the first reading time becomes equivalent to that of the voltage of the reference signal RAMP obtained at the second reading time. That is to say, the value of amplitude of the reference signal RAMP 1 obtained at the first reading time becomes 8 Vr, and that of the reference signal RAMP2 obtained at the second reading time becomes 8/4=2 Vr. Subsequently, the column-parallel ADCs of the column-parallel-ADC block 15 achieve the same precision, which allows for executing the subtraction (the second comparison-time period)−(the first comparison-time period) correctly by using the up/down counter. The up/down counter 24 is provided, as a 2-bit-up/down counter, and the number of counting that can be performed by the up/down counter 24 is smaller than that of counting performed over a count-time period where counting is performed two times. The up/down counter 24 performs 2-bit-counting down and 2-bit-counting up repeatedly over a range of from 0 to 3. Namely, the precision of 2 bits of 14 bits on the least-significant-bit (LSB) side is determined over a predetermined time period. For example, at the second reading time, counting is performed only over the time period which is one-fourth of a time period required to perform 14-bit-precision-full counting.

After the above-described analog-to-digital-conversion (AD conversion) period, the column-scanning circuit 17 performs the following processing for the 12-bit-digital signal stored in the up/down counter 23. Namely, two bits stored in the up/down counter 24 are determined to be two bits on the least-significant-bit (LSB) side so that the expression i+j=12+2=14 bits holds, and the 12-bit-digital signals are externally transmitted via fourteen horizontal-output lines 16 in sequence. After that, the above-described operations are performed for each of the rows in sequence so that a two-dimensional image is generated. If the up/down counter 23 is provided, as a 13-bit-up/down counter, the digital signals are externally transmitted via fifteen horizontal-output lines 16 in sequence. After that, the above-described operations are performed for each of the rows in sequence so that the two-dimensional image is generated.

Figure 4:
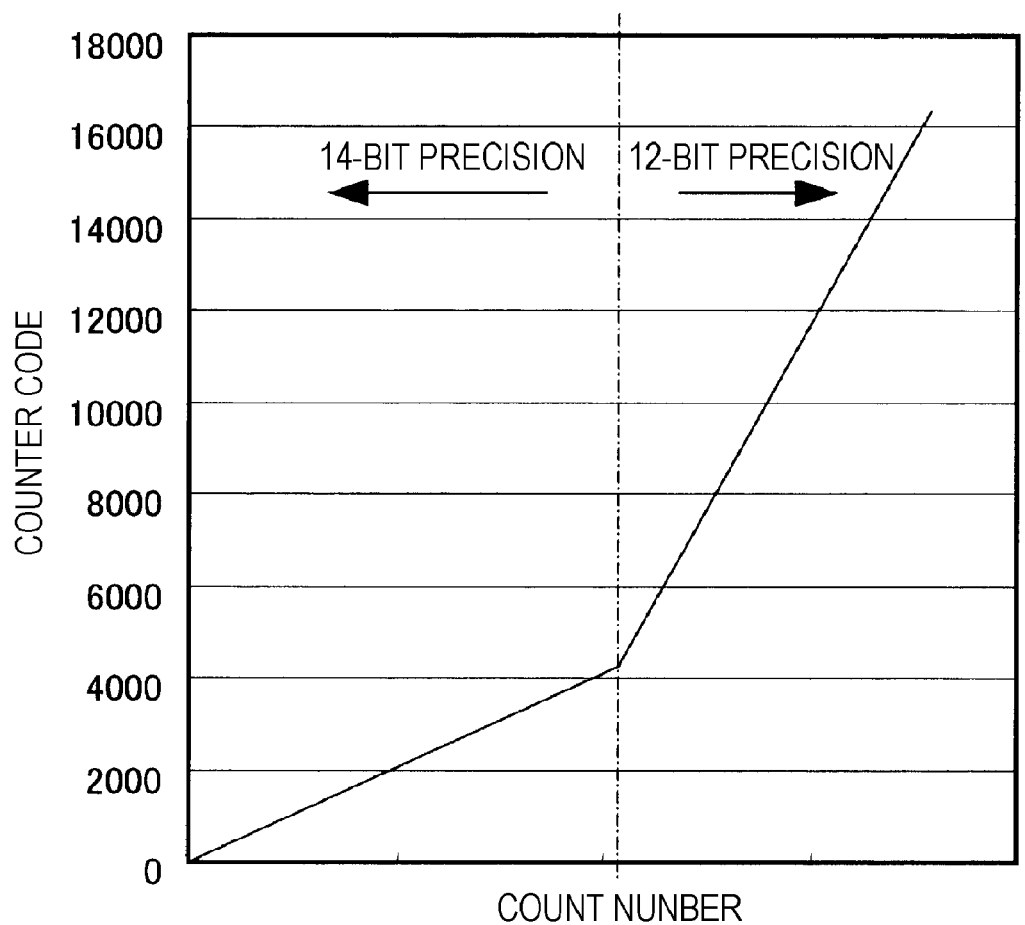
FIG. 4 shows the relationship between an output-count code and the count number.

FIG. 4 is a plot of output-count codes shown with reference to the count number according to the first embodiment.

As shown in FIG. 4, an external output is obtained by subjecting a 12-bit output transmitted from the up/down counter 23 to 2-bit shifting and adding an output transmitted from the up/down counter 24 to the low-order 2 bits of the 12-bit output. In total, therefore, the external output becomes a 14-bit output. However, over the entire 12-bit-count-time period of from 0 to 4095, outputs are transmitted with 14-bit precision. Over a time period of from 4096 and up, the up/down counter 24 stops operating and outputs are transmitted in steps of 4 bits (namely, 12-bit precision).

Usually, the number of light-shot noises caused by fluctuations of light inputs holds a dominant position in an area where a large quantity of light is obtained. Namely, when the incident-electron number is indicated by N, the light-shot noise is indicated by $\sqrt{N}$. Therefore, if high precision can be attained on the low-count-number side (=the low-light-quantity side), as in the first embodiment, a drop in the precision causes no problem when a large quantity of light is obtained.

As has been described, the first embodiment allows for obtaining a 14-bit-precision output within a necessary light-quantity area over a 12-bit-precision-count-time period without using a high-speed clock and/or increasing the count-time period, as compared to previously known technologies. According to the first embodiment, a 14-bit output is obtained where the expressions i=12 and j=2 hold, for example. However, the bit precision can be arbitrarily changed by adjusting both the corresponding counter-bit number and the amplitude of the reference signal RAMP.

Figure 5:
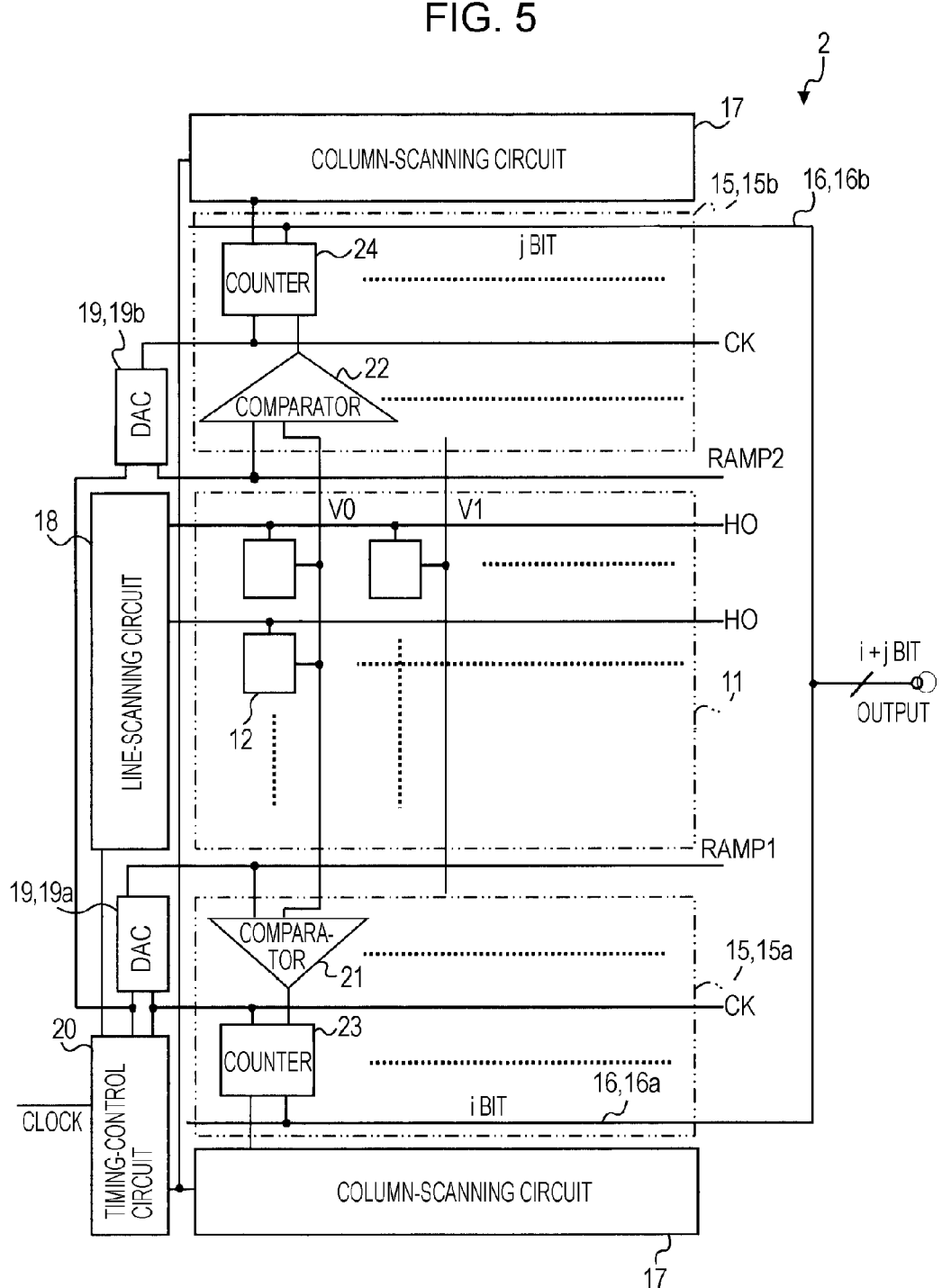
FIG. 5 is a block diagram illustrating another embodiment (a second embodiment) of the present invention.

FIG. 5 is a block diagram illustrating another embodiment (a second embodiment) of the present invention. FIG. 5 shows another example CMOS sensor with a column-parallel ADC mounted thereon.

According to the second embodiment, as shown in FIG. 5, the comparator 21 and the counter (an up/down counter, for example) 23 are provided on one of the sides (the lower side in the second embodiment) of the pixel array 11, where the comparator 21 and the counter 23 are necessary for every column and used, so as to count a high-order i bit. Further, the comparator 22 and the counter (an up/down counter, for example) 24 are provided on the other side (the upper side in the second embodiment) of the pixel array 11, where the comparator 22 and the counter 24 are used, so as to count a low-order j bit.

Namely, a solid-state-image-pickup device 2 includes a plurality of pixels 12 arranged in matrix form in a two-dimensional manner, so that a pixel array 11 is formed. Each of the pixels 12 includes a photodiode and an in-pixel amplifier, for example.

A column-parallel analog-to-digital converter (a column-parallel ADC) is provided on one of the sides of the pixel array 11 (the lower side of FIG. 5). The column-parallel ADC includes the comparator 21 and the up/down counter 23. The comparator 21 compares the reference signal (the reference voltage) RAMP 1 generated by the DAC 19 (19a) to an analog signal obtained from the pixel 12 for each of the row lines H0, H1, and so forth via the column lines V0, V1, and so forth. The up/down counter 23 counts a time period required to finish the comparison made by the comparator 21, and stores information about the count result.

Another column-parallel analog-to-digital converter is provided on the other side of the pixel array 11 (the upper side of FIG. 5). The column-parallel ADC includes the comparator 22 and the up/down counter 24. The comparator 22 compares the reference signal (the reference voltage) RAMP2 generated by the DAC 19 (19b) to an analog signal obtained from the pixel 12 for each of the row lines H0, H1, and so forth via the column lines V0, V1, and so forth. The up/down counter 24 counts a time period required to finish the comparison made by the comparator 22, and stores information about the count result. The timing-control circuit 20 controls each of the time where the DAC 19a generates the reference signal RAMP1 and the time where the DAC 19b generates the reference signal RAMP2.

The above-described comparator 21 and up/down counter 23 achieve the i-bit-digital-signal-conversion function (where the letter i denotes a natural number), and the above-described comparator 22 and up/down counter 24 achieve the j-bit-digital-signal-conversion function (where the letter j indicates another natural number and the expression i>j holds). The comparator 21 and the up/down counter 23 are provided for each of the column lines V0, V1, and so forth so that the column-parallel ADC block 15 (15a) is generated. The comparator 22 and the counter 24 are provided for each of the column lines V0, V1, and so forth so that the column-parallel ADC block 15 (15b) is generated.

Each of the horizontal-output lines 16 (16a and 16b) includes the i+j-bit-wide horizontal-output line, and the i+j sense circuits and the i+j output circuits, where each of the sense circuits and output circuits corresponds to each of the horizontal-output lines. Further, the timing-control circuit 20 generating an internal clock, the row-scanning circuit 18 configured to control a row address and row scanning, and the column-scanning circuit 17 configured to control a column address and column scanning are provided, as a control circuit configured to read signals transmitted from the pixel array 11 in sequence. Still further, though not shown, other various signal-processing circuits may be provided.

The above-described solid-state image-pickup device 2 performs the same operations as those performed by the solid-state image-pickup device 1. A column-parallel-ADC block 15a and a column-parallel-ADC block 15b are provided in the solid-state image-pickup device 2 so that the largest possible number of comparators and up/down counters can be provided, where the largest possible number is determined on the basis of the pitches between columns of the pixels 12. Subsequently, the solid-state image-pickup device 2 is adaptable to the case where each of the pixels 12 is reduced in size. Further, the solid-state image-pickup device 2 can produce the same effect as that of the solid-state image-pickup device 1.

Figure 6:
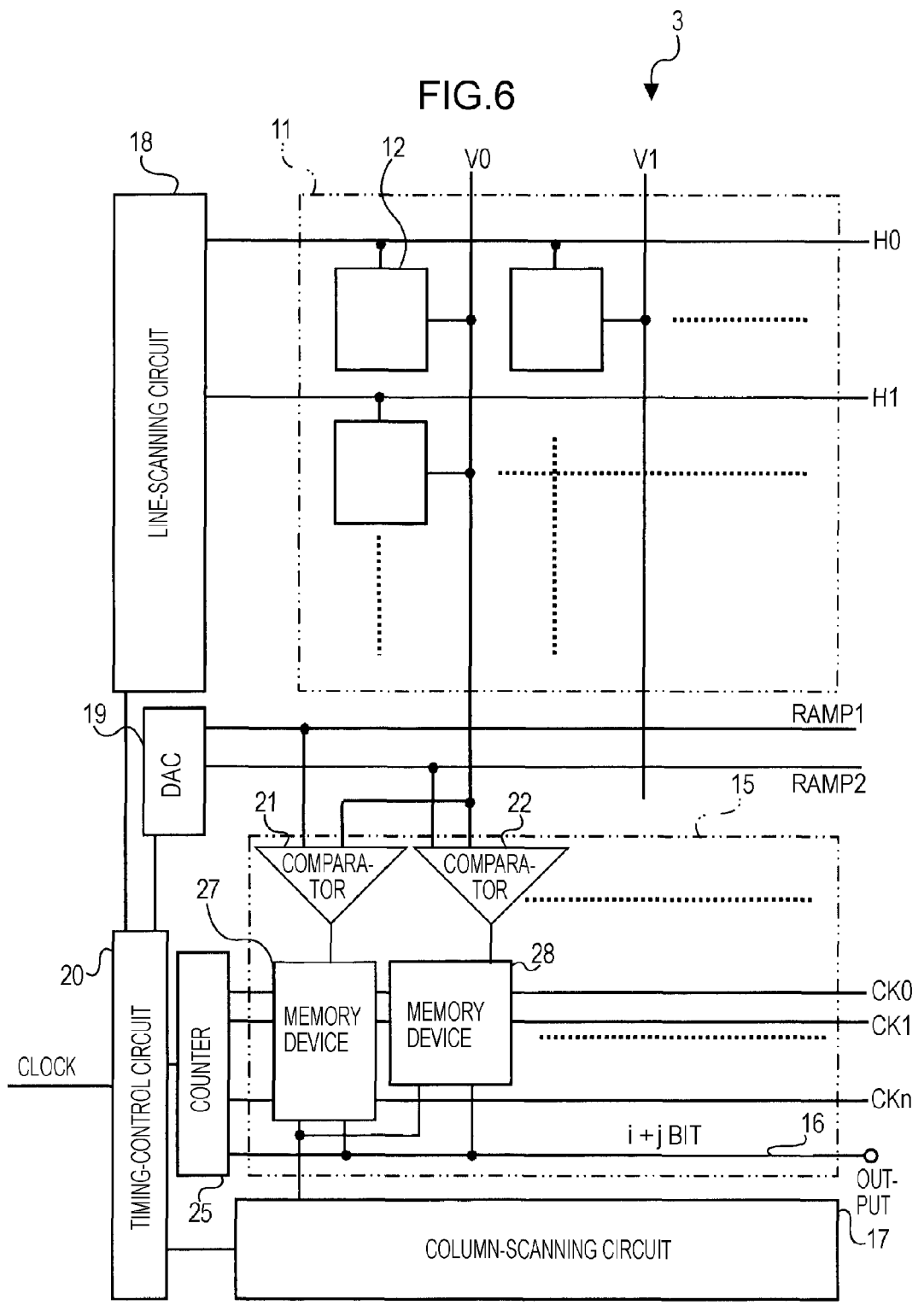
FIG. 6 is a block diagram illustrating another embodiment (a third embodiment) of the present invention.
Figure 7:
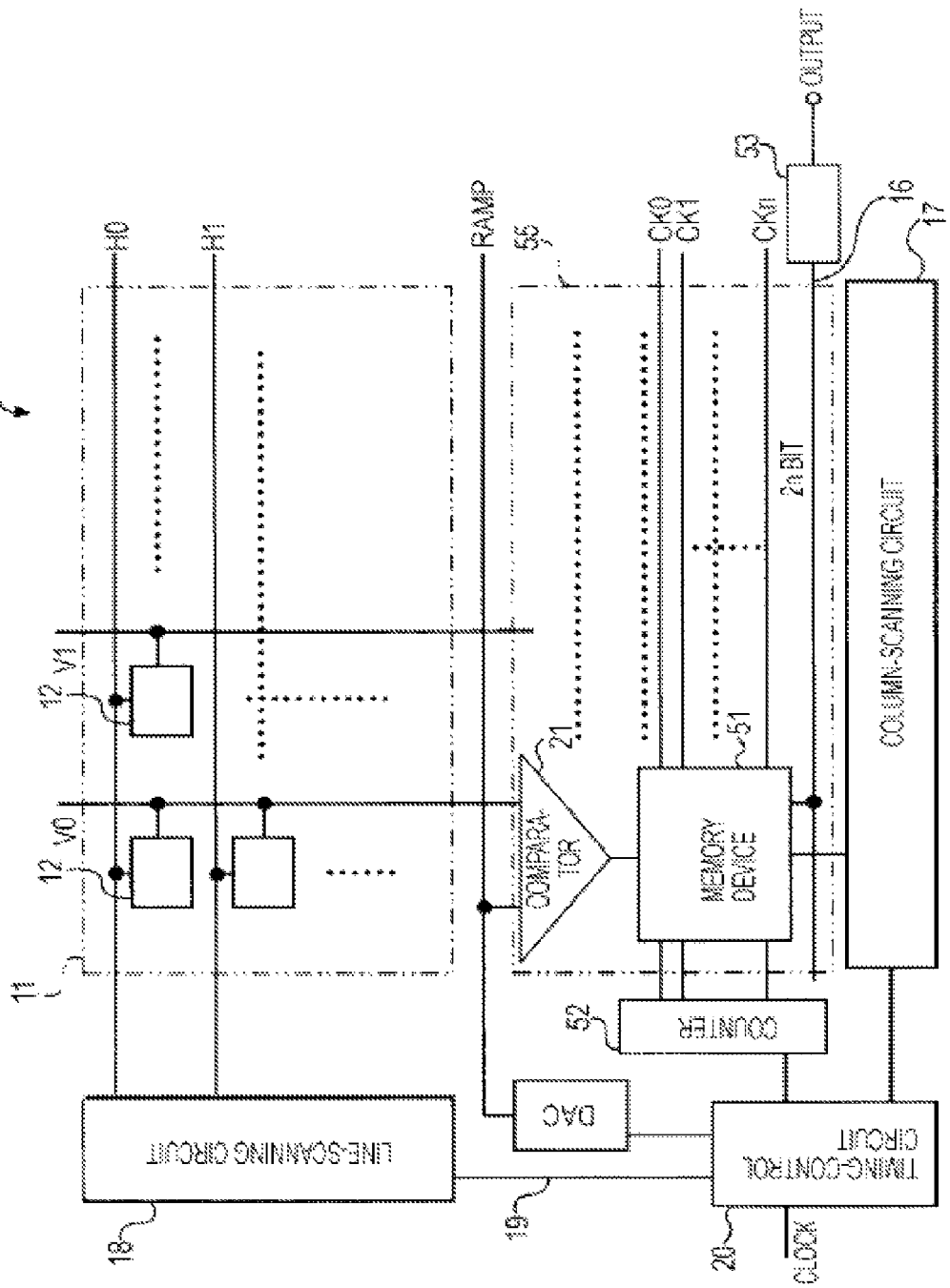
FIG. 7 is a block diagram illustrating an example known solid-state image-pickup device.
Figure 8:
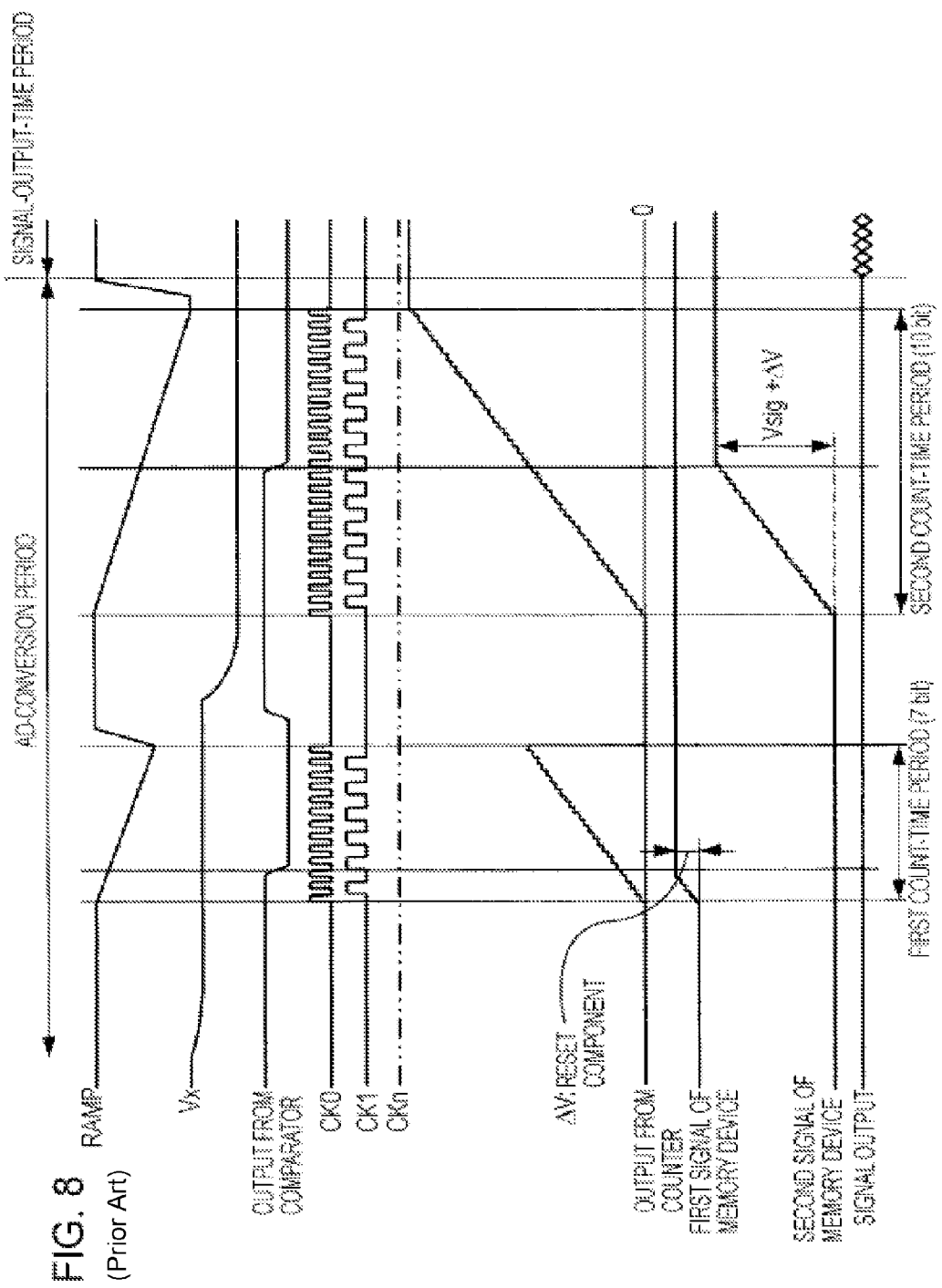
FIG. 8 is a timing chart showing operations performed by the example known solid-state image-pickup device.

FIG. 6 is a block diagram illustrating another embodiment (a third embodiment) of the present invention. FIG. 6 shows another example CMOS-image sensor with a column-parallel ADC mounted thereon.

As shown in FIG. 6, the configuration of the solid-state image-pickup device 3 is partly the same as that of the solid-state image-pickup device 1. Namely, a column-parallel ADC of the column-parallel-ADC block 15 includes the comparators 21 and 22, and memory devices 27 and 28. The comparators 21 and 22 compare the reference signals (the reference voltages) RAMP1 and RAMP2 generated by the DAC 19 to an analog signal obtained from the pixel 12 for each of the row lines H0, H1, and so forth via the column lines V0, V1, and so forth. Each of the memory devices 27 and 28 stores information about a result of counting performed by a counter 25 configured to count the comparison-time period. The above-described comparator 21 and memory device 27 achieve the i-bit-digital-signal-conversion function (where the letter i denotes a natural number), and the above-described comparator 22 and memory device 28 achieve the j-bit-digital-signal-conversion function (where the letter j indicates another natural number and the expression i>j holds). The comparators 21 and 22, and the memory devices 27 and 28 are provided for each of the column lines V0, V1, and so forth so that the column-parallel ADC block 15 is generated.

The operations performed by the solid-state image-pickup device 3 are essentially the same as those performed by the solid-state image-pickup device 1. In the solid-state image-pickup device 3, however, the counter 25 counts a time period required to finish the comparison made by each of the comparators 21 and 22, and information about a result of the counting is not stored in the counter, but stored in each of the memory devices 27 and 28, which is different from the case where the solid-state image-pickup device 1 is used. Except for those mentioned above, the configuration and operations of the solid-state image-pickup device 3 are the same as those of the solid-state image-pickup device 1. Further, the solid-state image-pickup device 3 can achieve the same functions and effects as those of the solid-state image-pickup device 1.

Figure 9:
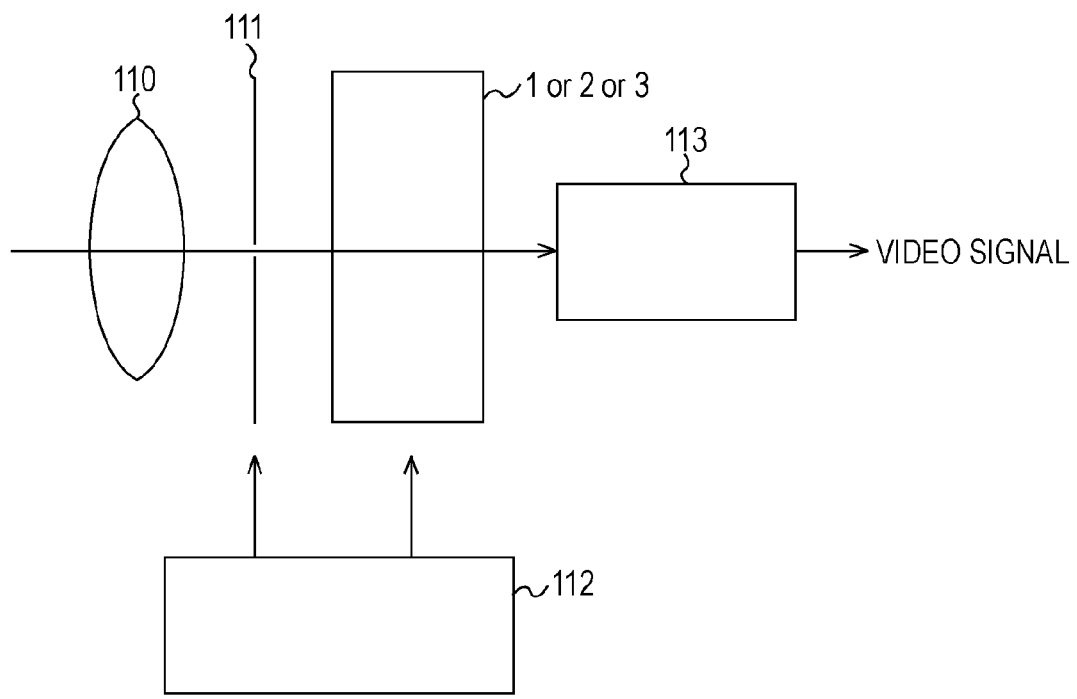
FIG. 9 is a block diagram showing a camera system according to another embodiment of the present invention.

FIG. 9 is a sectional view of a camera system according to the first embodiment, the second embodiment, and a third embodiment of the present invention. The above-described camera system is an example video camera that can photograph video. The above-described camera system includes the solid-state image-pickup device 1, 2, or 3, an optical system 110, a shutter device 111, a drive circuit 112, and a signal-processing circuit 113.

The optical system 110 forms an image of image light (incident light) reflected from a subject on an image-pickup surface of the solid-state image-pickup device 1, the solid-state image-pickup device 2, or the solid-state image-pickup device 3. Subsequently, electrical charges of the signals corresponding to the image light are accumulated in the solid-state image-pickup device 1, the solid-state image-pickup device 2, or the solid-state image-pickup device 3.

The shutter device 111 controls the time period where the solid-state image-pickup device 1, the solid-state image-pickup device 2, or the solid-state image-pickup device 3 is irradiated with light and the time period where the solid-state image-pickup device 1, the solid-state image-pickup device 2, or the solid-state image-pickup device 3 is shielded from light.

The drive circuit 112 transmits a drive signal controlling transfer operations of the solid-state image-pickup device 1, the solid-state image-pickup device 2, or the solid-state image-pickup device 3 and shuttering operations of the shutter device 11. Electrical charges of the solid-state image-pickup device 1, the solid-state image-pickup device 2, or the solid-state image-pickup device 3 are transferred by using the drive signal (a timing signal) transmitted from the drive circuit 112. The signal-processing circuit 113 performs various types of signal processing. A video signal subjected to the signal processing is recorded onto a recording medium including a memory or the like and/or transmitted to a monitor.

In the camera system according to the first embodiment, a first control-signal line configured to control a first pixel and a second control-signal line configured to control a second pixel are driven separately, where the sensitivity of the second pixel is higher than that of the first pixel. Subsequently, the first pixel and the second pixel can be driven separately. Therefore, different exposure time periods and/or different read times can be set to the first and second pixels at the same time.

Further, since the different exposure time periods and/or the different read times can be set to the first and second pixels, an appropriate signal can be obtained by increasing the exposure-time period for the first pixel with sensitivity lower than that of the second pixel, which prevents the S/N ratio from being deteriorated. Further, it becomes possible to prevent the second pixel from being saturated by decreasing the exposure-time period, so that a large dynamic range can be obtained.

In the camera system according to the second embodiment, the pixels can be arranged so that outputs from the first pixel, which is the low-sensitivity pixel, and the second pixel, which is the high-sensitivity pixel can be obtained separately. Subsequently, the value of the first pixel and that of the second pixel can be read separately, which makes it easy to access the second pixel alone at a high frame rate. Therefore, it becomes possible to prevent the second pixel from being saturated. Further, a high S/N ratio can be obtained by acquiring a plurality of frames.

In the camera system according to the third embodiment, a plurality of the second pixels, that is, the high-sensitivity pixels is arranged at regular intervals in the lateral and longitudinal directions. Therefore, a high-density brightness resolution can be obtained through the high-sensitivity second pixels with high S/N ratio, which increases the image resolution.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state image-pickup device comprising: a plurality of pixels, each converting an incident-light quantity into a respective electrical signal and a plurality of analog-to-digital converters each of which converts an analog signal obtained from a respective one of the pixels into a digital signal,
wherein,
each analog-to-digital converter includes (a) an output having a plurality of bits; and (b) a plurality of comparators including first and second comparators, wherein each of the comparators compares a respective one of a plurality of reference voltages changing over time to the analog signal from the same one of the pixels, and at least first and second reference voltages are transmitted to respective ones of the comparators,
the first comparator is associated with a first portion of the plurality of bits of the output, and the second comparator is associated with a second portion of the plurality of bits of the output, each of the first and second portions being greater than 1 bit, and
the analog signal is read from the pixel two times for each row, and a difference between a result of first reading and a result of second reading is calculated.

2. The solid-state image-pickup device according to claim 1, wherein each of the reference voltages are different from each other.

3. The solid-state image-pickup device according to claim 1, wherein:
a reset component including a noise of the pixel is obtained through the first reading, and
the reset component to which a signal component of the pixel is added is obtained through the second reading.

4. A camera system comprising: a solid-state imaging device with a plurality of pixels, each converting an incident-light quantity into a respective electrical signal, and a plurality of analog-to-digital converters each of which converts an analog signal obtained from a respective one of the pixels into a digital signal,
wherein,
each analog-to-digital converter includes (a) an output having a plurality of bits;
and (b) a plurality of comparators including first and second comparators, wherein each of the comparators compares a respective one of a plurality of reference voltages changing over time to the analog signal from the same one of the pixels, and at least first and second reference voltages are transmitted to respective ones of the comparators,
the first comparator is associated with a first portion of the plurality of bits of the output, and the second comparator is associated with a second portion of the plurality of bits of the ouptut, each of the first and second portions being greater than 1 bit, and
the analog signal is read from the pixel two times for each row, and a difference between a result of first reading and a result of second reading is calculated.

5. The camera system according to claim 4, wherein each of the reference voltages are different from each other.

6. A method of driving a camera system having an image pickup device with a plurality of pixels, each converting an incident-light quantity into a respective electrical signal, and a plurality of analog-to-digital converters each of which converts an analog signal obtained from a respective one of pixels into a digital signal, each analog-to-digital converter including (a) an output having a plurality of bits and (b) a plurality of comparators including first and second comparators, the method comprising the steps of:
transmitting a respective one of a plurality of reference voltages to each of the comparators of one of the analog-to-digital converters, each reference voltage being different from each other;
comparing a first of the different reference voltages changing over time to the analog signal from the respective one of the pixels by using a first comparator of the one analog-to-digital converter; and
comparing a second of the different reference voltages changing over time to the analog signal from the same respective one of the pixels by using a second comparator of the one analog-to-digital converter,
wherein,
the first comparator is associated with a first portion of the plurality of bits of the output, and the second comparator is associated with a second portion of the plurality of bits of the output, each of the first and second portions being greater than 1 bit, and
the analog signal is read from the pixel two times for each row, and a difference between a result of the first reading and a result of the second reading is calculated.

7. The method of claim 6, wherein:
a reset component including a noise of the pixel is obtained through the first reading; and
the reset component to which a signal component of the pixel is added is obtained through the second reading.

* * * * *